United States Patent
Henne et al.

(10) Patent No.: US 7,440,517 B1
(45) Date of Patent: Oct. 21, 2008

(54) METHOD AND APPARATUS FOR SWITCHING BETWEEN MULTIPLE WAVEFORMS

(76) Inventors: Roland R. Henne, 1515 W. 950 N, Provo, UT (US) 84604; Brad T. Hansen, 728 Loveland Ave., Salt Lake City, UT (US) 84106; Osama Haddadin, 1608 Princeton Ave., Salt Lake City, UT (US) 84105

( * ) Notice: Subject to any disclaimer, the term of this patent is extended or adjusted under 35 U.S.C. 154(b) by 502 days.

(21) Appl. No.: 10/944,685

(22) Filed: Sep. 17, 2004

(51) Int. Cl.
*H04L 27/00* (2006.01)
(52) U.S. Cl. .................................................. 375/324
(58) Field of Classification Search .................. 375/316, 375/340, 343, 222, 259, 295, 322, 324, 354, 375/371, 373, 219, 358
See application file for complete search history.

(56) References Cited

U.S. PATENT DOCUMENTS

| | | | | |
|---|---|---|---|---|
| 5,799,037 A * | 8/1998 | Strolle et al. | ................. | 375/233 |
| 6,192,070 B1 * | 2/2001 | Poon et al. | ................... | 375/222 |
| 6,549,587 B1 * | 4/2003 | Li | ............................... | 375/326 |
| 2002/0067762 A1 * | 6/2002 | Neufeld et al. | ............... | 375/149 |
| 2003/0021334 A1 * | 1/2003 | Levin et al. | .................. | 375/147 |
| 2007/0079207 A1 * | 4/2007 | Seidel et al. | ................ | 714/748 |

* cited by examiner

*Primary Examiner*—Mohammad Ghayour
*Assistant Examiner*—Vineeta S Panwalkar

(57) ABSTRACT

A method and system is disclosed for demodulating multiple waveforms, with different modulation formats, in the same hardware by providing a software-configurable demodulator that configures itself in response to varying input waveform types. The system reconfigures its logic to accommodate the format of the signals being received and further allows for reconfiguration of demodulator functional block interfaces to remove downtime during multiple waveform processing.

10 Claims, 5 Drawing Sheets

METHOD AND APPARATUS FOR SWITCHING BETWEEN MULTIPLE WAVEFORMS

BACKGROUND OF THE INVENTION

1. Field of the Invention

The present invention relates to modulators and demodulators and, more particularly, to a method and apparatus for switching between multiple waveforms.

2. Description of Related Art

In recent years due to the rapid development of multimedia, digital, audio, and video communications applications, there is a necessity for efficient and reliable signal modulation and demodulation techniques to accommodate different modulation formats based on the media over which the signals are to be transmitted. For instance, with respect to high definition television, and in fact other types of advanced television transmissions, program material in video, data, or audio form is formatted by a channel encoder to be transmittable by Vestigial Side Band modulation or VSB which is typical for over-the-air television transmissions. Quadrature Amplitude Modulation or QAM is typically used for cable transmissions, whereas Quadrature Phase Shift Keying or QPSK is generally used in satellite communication. For radio communications Time-Division Multiplexing (TDM) modulation and error correction formats are utilized. Finally, discrete multitone or DMT techniques are typically used for telephone landline signaling such as with Asymmetric Digital Subscriber Lines or ADSL. It will be appreciated that when a video source at the transmit side is encoded through a source coding unit, the source coding unit is set up to code the video source material in one of the four above-mentioned modulation formats. Likewise, on the receive side in order for a receiver to decode all of the above mentioned formats discrete VLSI chips or detectors can be provided in parallel, with the outputs going to source decoding.

It is apparent that receivers utilized for processing multiple modulation formats utilize a series of demodulators each configured to demodulate a particular format. This duplication of demodulators is costly and may suffer technical problems such as switching transients and cross modulation between different demodulators.

Furthermore, in a radio (modem) application, where characteristics such as modulation type, data rate, error correction coding, etc, are required to change quickly during operation, prior art methods of processing multiple-modulation formats can result in loss of data and dataflow.

It will be thus appreciated that any parallel processing solution to the problem of multiple modulation formats generally involves increased hardware complexity and increased cost.

It is therefore an object of the present invention to provide a receiver capable of demodulating multiple modulation formats without losing data or interrupting dataflow, the receiver containing a single demodulator with re-configurable logic therein.

It is a further object of the present invention to provide a method for demodulating multiple waveforms of different characteristics, in a software defined demodulator, without losing data or interrupting dataflow.

It is still a further object of subject invention to demodulate multiple waveforms in the same hardware by providing a re-configurable software defined demodulator that reconfigures itself in response to varying input waveform configuration parameters.

SUMMARY OF THE INVENTION

The foregoing and other problems are overcome, and other advantages are realized, in accordance with the presently preferred embodiments of these teachings.

In accordance with one embodiment of the present invention a method for switching between multiple waveforms in a software defined receiver is provided. The method includes demodulating a plurality of input waveforms within a first and second demodulator period, respectively, within software configurable hardware. The software configurable hardware is defined by a plurality of functional blocks having input nodes, output nodes, and feedback nodes. The method includes receiving a first input waveform and determining the modulation format type of the first input waveform. The method also includes generating a first configuration instruction based upon the modulation format type to the software configurable hardware. Next, the method configures the software configurable hardware in accordance the configuration instruction. The method also includes receiving a second input waveform and determining a second modulation format type of the second input waveform. The method then generates a second configuration instruction based on second modulation format type and configures the software configurable hardware in accordance with the configuration instruction. The method determines if the software configurable hardware contains a feedback node; and opens the feedback node during the second demodulator period if the first configuration instruction is different from the second configuration instruction.

In accordance with one embodiment of the present invention, a system in which information is transmitted from a send side to a receive side over a communications channel is provided. The receive side includes software configurable logic circuits and feedback loops with means for determining a modulation format type; and means for demodulating the transmitted information. The means for demodulating includes generating instructions including modulation format configuration data based on the modulation format configuration data and feedback loops.

The invention is also directed towards a program storage device tangibly embodying a program of instructions executable by the machine for demodulating multiple waveforms within software configurable hardware. The software configurable hardware defined by a plurality of functional blocks, having input nodes, output nodes, and feedback nodes: the feedback nodes defining feedback loops within the hardware. The instructions include determining a modulation format type of a first input signal during a first demodulation period and generating a first configuration instruction to the software configurable hardware during the first demodulation period, based on the modulation format type. The instructions also include configuring the software configurable hardware during the first demodulation period to the modulation format type specified by the first configuration instruction. The software configurable hardware includes logic elements whose functionality is capable of being changed in software. The instructions also include determining a modulation format type of a second input signal during a second demodulation period and generating a second configuration instruction to the software configurable hardware during the second demodulation period, based on the second modulation format type. The instructions configure the software configurable hardware during the second demodulation period to the modulation format type specified by the second configuration instruction. Finally, the instructions determining if said software configurable hardware at said second demodulator time frame contains a feedback node; and opens the feedback node during the second demodulator period if the first configuration instruction is different from the second configuration instruction.

In accordance with another embodiment of the present invention, a demodulation system for fast demodulation of a first waveform and a second waveform is provided. The demodulation system includes a plurality of programmable functional units, each of the plurality of programmable functional units adapted to process the second waveform upon completion of processing the first waveform. The demodulation system also includes a waveform configuration controller coupled to the plurality of programmable functional units.

The invention is also directed towards an integrated circuit (IC) for demodulating a first waveform and a second waveform. The IC includes a programmable demodulator, having a plurality of programmable functional units programmable to process the second waveform upon completion of processing the first waveform. The IC also includes at least one waveform configuration controller adapted to reconfigure each of the plurality of programmable functional units in accordance with the first waveform or the second waveform.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Overview

Figure 1:
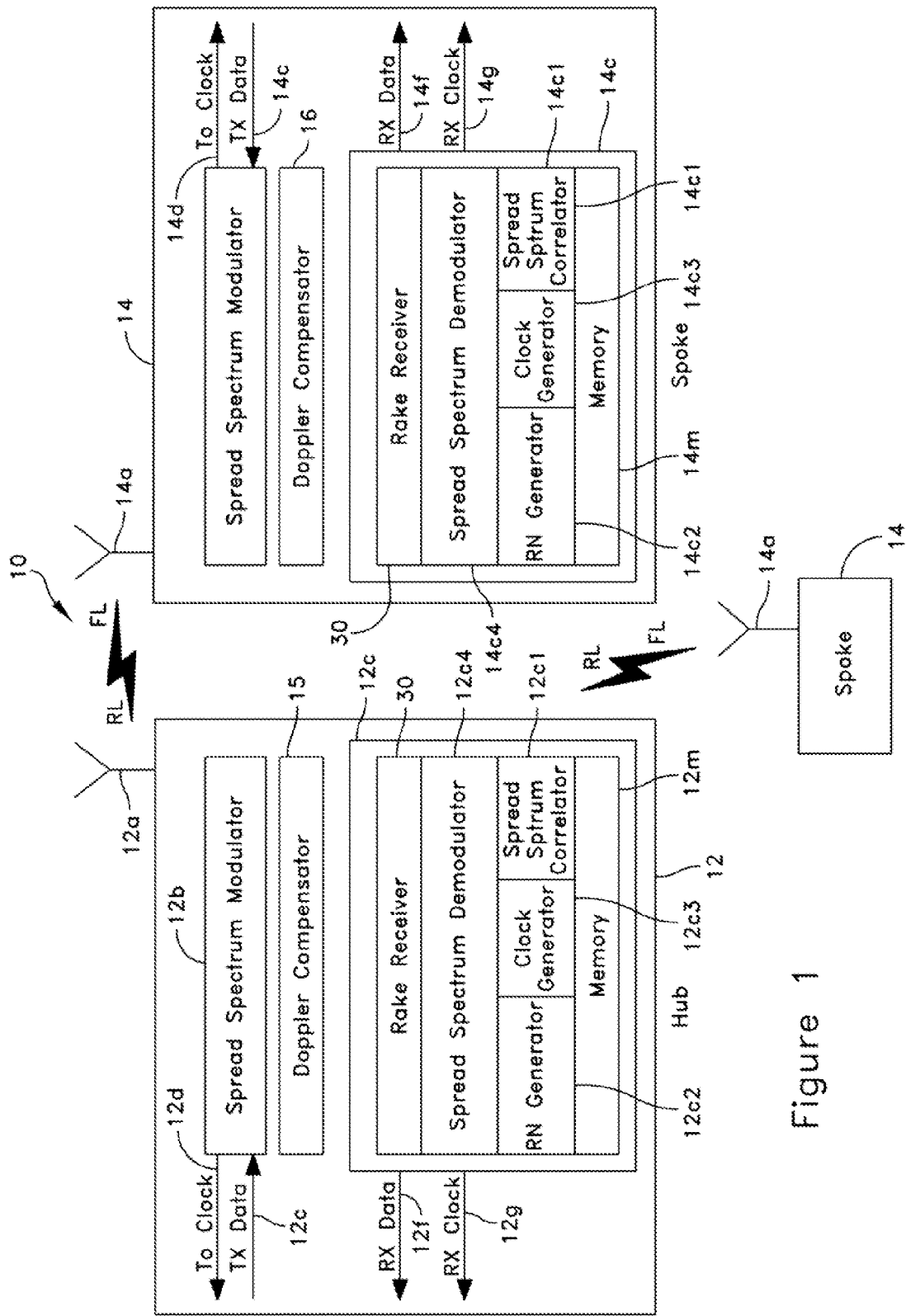
FIG. 1 is a pictorial diagram of a communication system incorporating features of the present invention.

Generally, local and remote computers communicate over a transmission medium by way of computer modems. Referring to FIG. 1, a modem/demodulator 12c4 is contained in a hub communication system 12 or a modem/demodulator 14c4 in a spoke communication system 14 as shown in FIG. 1 communication system 10. An information source 15 generating digital or analog images, video, or speech, is converted into a bit stream by source encoder 20 and data compressed prior to being input to channel encoder 25 of modem 10. Channel encoder 25 introduces redundancy in the binary information sequence that can be used at the receiver to overcome the effects of noise and interference encountered in the transmission of the signal over communications channel 35. The added redundancy serves to increase the reliability of the received data and is introduced through convolutional codes, turbo codes, and interleaving for channels with burst errors. The binary sequence is next input to digital modulator 30 for conversion into a signal waveform suitable for output over communications channel 35. This channel includes free space for wireless communications or physical media, such as telephone lines, for communication over telephone channels.

At the receiving end, digital demodulator 40 reduces the modulated signal waveform to a binary sequence for input to channel decoder 45 which reconstructs the original signal sequence from knowledge of the codes used by the channel encoder 25 and the redundancy contained in the received data. Source decoder 50 decompresses the original signal for output 55.

Figure 3:
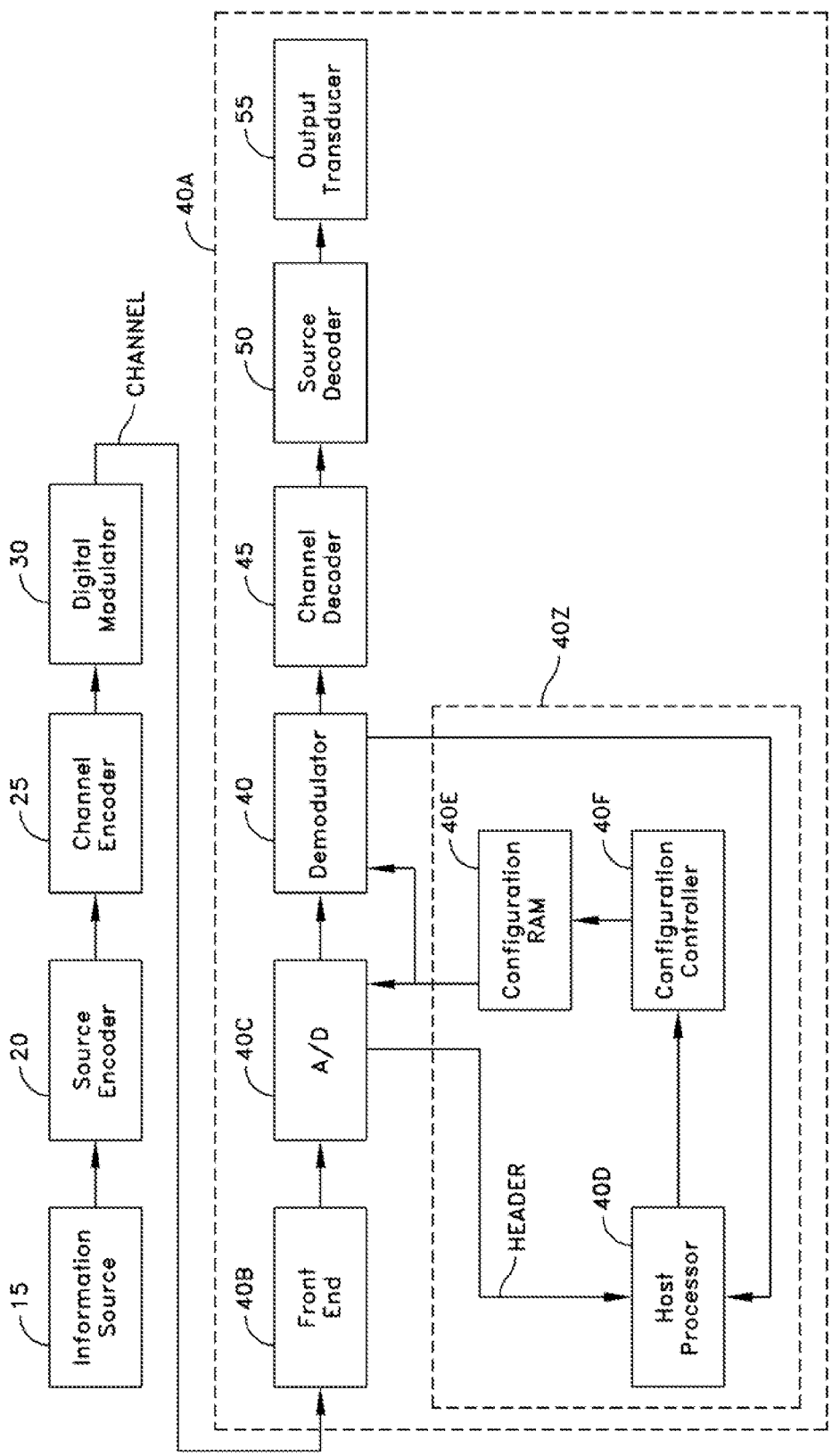
FIG. 3 is a block diagram of a communications system with the receiver side of FIG. 2 (illustrated in broken lines) showing the utilization of a configuration controller, configuration RAM and a configurable demodulator.

Referring to FIG. 3, receiver circuitry including digital demodulation circuit 40 is illustrated within dotted lines 40A. It is understood that the receiver circuitry 40A may be implemented in a Field Programmable Gate array (FPGA) that can be programmed to support demodulation of multiple waveforms. This software-defined demodulation utilizes mirrored RAMs and Registers to store the "current" and "next" waveform parameters during the demodulation process. As different waveforms enter the receive side 40A the switching from mode to mode (or waveform to waveform) occurs gradually throughout the demodulator 40, the demodulator 40 processing and delaying the control signals throughout the demodulation process.

In one embodiment, a software configurable demodulator is implemented using a general purpose microprocessor and is software-reconfigured in accordance with the output of a configuration RAM.

In summary, a method and apparatus for switching between multiple waveforms has a software configurable demodulator which accommodates different modulation formats such as those associated with terrestrial, cable, phone line, satellite and wireless communications to be received through a single device which has configurable logic to accommodate the format of the signals being received. The system detects the modulation format of the incoming signal and reconfigures the logic of its software-configurable demodulator to output demodulated digital data for further processing. The incoming signal is A/D converted, with a host processor utilized to detect the type of modulation associated with the incoming signal and through a configuration controller configures a random access memory, which is coupled to the software-configurable demodulator.

Figure 4:
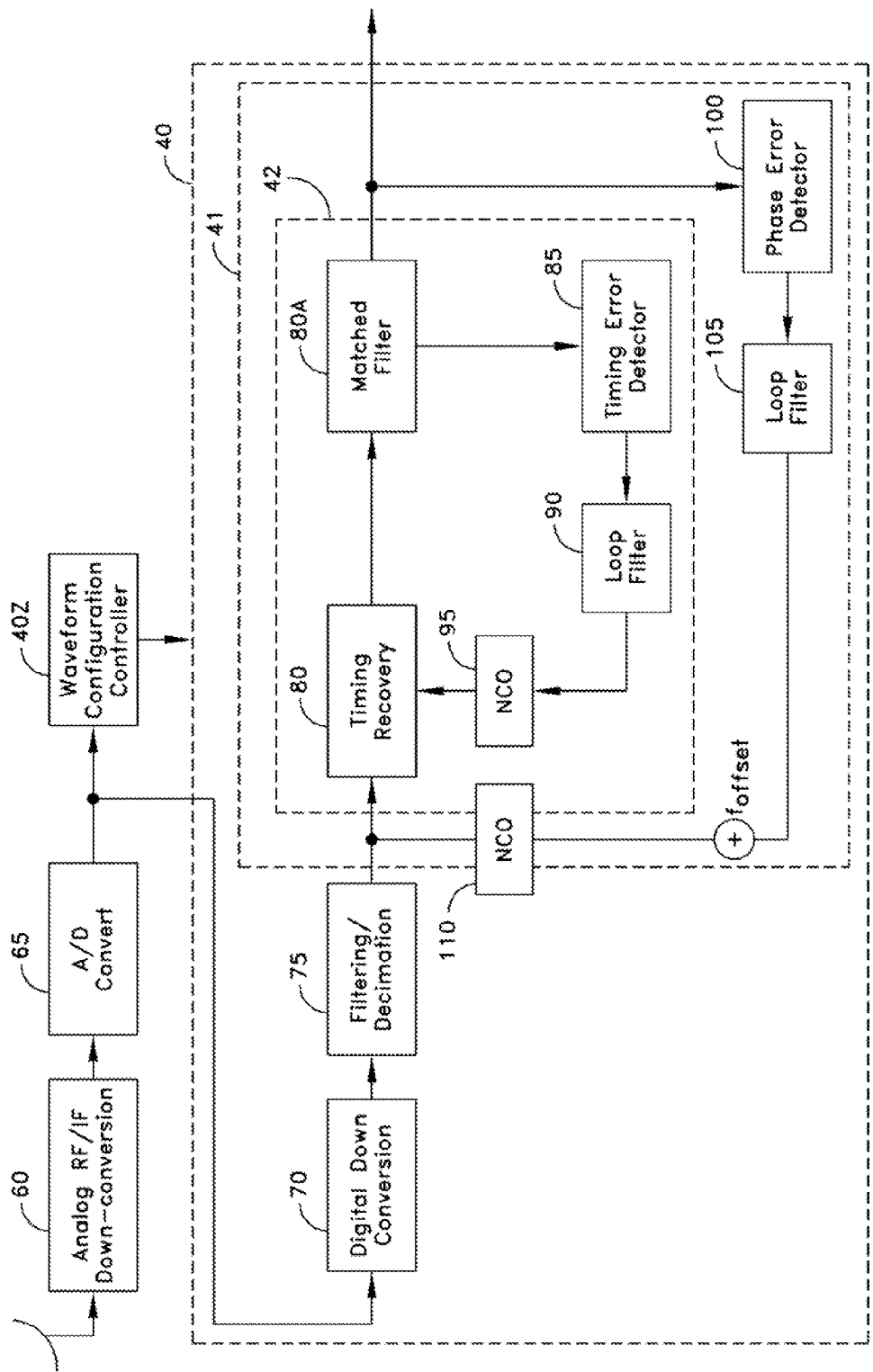
FIG. 4 is a detailed view of the demodulator of subject invention shown within broken lines 40.

Referring to FIG. 4, as multiple waveforms pass through the demodulation stage 40, functional blocks 70 through 110 are reconfigured or switched to utilize configuration parameters necessary to demodulate the current waveform. Functional blocks 70 through 110 are individually reconfigured to utilize new parameters when the last sample from the current waveform exits the block and the first sample from the next waveform enters the block. Feedback loops are also reconfigured (opened and closed) to support the processing of the current and next waveforms throughout the demodulation.

Waveforms such as AEHF, multi-mode, and frequency hopped require several very different demodulation characteristics to support them. Implementing a software defined demodulation method in an FPGA requires minimal hardware, and provides enhanced data integrity by minimizing loss of data, timing and downtime.

Referring now to FIG. 1, there is shown a block diagram of a communication system that can advantageously incorporate features of the present invention. FIG. 1 shows a full-duplex system 10 that is suitable for practicing this invention. Specifically, the system 10 employs direct sequence spread spectrum based techniques over an air link to provide data transfer between HUB 12 and SPOKE 14. The forward link (FL) from HUB 12 to SPOKE 14 contains a spread spectrum waveform, with the PN code being composed of even-length and/or maximal length codes. In a similar manner, the return link (RL) from SPOKE 14 to HUB 12 contains a spread spectrum waveform that is similar, or identical, to that of the FL.

Still referring to FIG. 1, HUB 12 includes a Spread Spectrum Modulator/Demodulator Modem (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. HUB 12 also includes an antenna 12a, which may transmit at any suitable RF frequency.

The signal generated by HUB 12 and transmitted by antenna 12a via the FL is received by SPOKE 14 via antenna 14a. Spoke 14 includes a spread spectrum correlator 14c1, PN generator 14c2, clock generator 14c3, and spread spectrum demodulator (SSD) 14c4. The received signal is then demodulated by SSD 14c4. Once the signal is acquired and the SPOKE 14 is tracking the received signal, the Rx Clock 14g and Rx Data 14f are output to the intended receiver circuitry.

Similarly, SPOKE 14 generates a Tx Clock 14d and Tx Data 14e using the Spread Spectrum Modulator 14b in a similar fashion described earlier for HUB. Likewise, HUB 12 may receive the RL signal via antenna 12a, and demodulate and track the signal as described earlier with receiver 12c to provide Rx Data 12f and Rx Clock 12g to the intended user.

Figure 2:
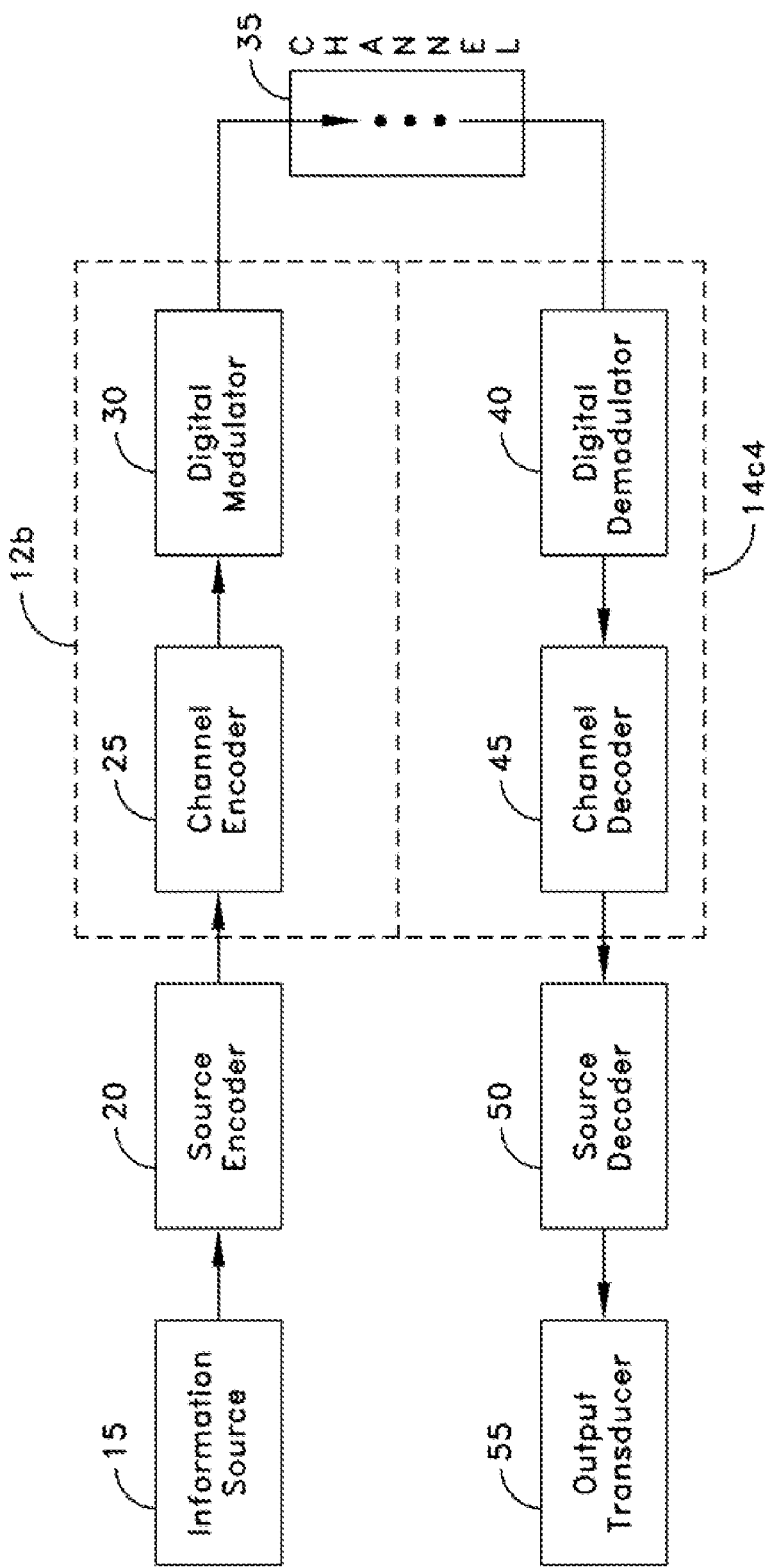
FIG. 2 is a block diagram of a communications system implementing subject invention within a Modulator/Demodulator (MODEM)

Referring also to FIG. 2, modem 12b contained in communication system such as shown in FIG. 1, is further illustrated within broken lines, and described herein. An information source 15 generating digital or analog images, video, or speech, is converted into a bit stream by source encoder 20 and data compressed prior to being input to channel encoder 25 of modem 10. Channel encoder 25 introduces redundancy in the binary information sequence that can be used at the receiver to overcome the effects of noise and interference encountered in the transmission of the signal. The added redundancy serves to increase the reliability of the received data and is introduced through convolutional codes, turbo codes, and interleaving for channels with burst errors. The binary sequence is next input to digital modulator 30 for conversion into a signal waveform suitable for output over communications channel 35. This channel includes free space for wireless communications or physical media, such as telephone lines, for communication over telephone channels.

In receive mode, digital demodulator 40 reduces the modulated signal waveform to a binary sequence for input to channel decoder 45 which reconstructs the original signal sequence from knowledge of the codes used by the channel encoder 25 and the redundancy contained in the received data. Source decoder 50 decompresses the original signal for input to output transducer 55.

Referring to FIG. 3, the receiver 40A of subject invention is illustrated within broken lines 40A. The receiver 40A, which is software-reconfigurable, has as an input to front end 40B a signal having a unique modulation format. The primary purpose of the front end is level adjustment, amplification, and filtering of the incoming modulated signals 30. The output of front end 40B is coupled to A/D converter 40C, and thence to a software-configurable demodulator 40. In one embodiment, the header of the input signal is stripped off and provided to a host processor 40D, which determines from flags in the header the modulation format type.

The output of host processor 40D specifies the modulation format to configuration controller 40F, which then selects from configuration RAM 40E the appropriate demodulation mode to be downloaded to demodulator 40. It is understood that other methods for determining modulation format type that are known in the art may be utilized in subject invention. Demodulator 40 also provides feedback to host processor 40D of demodulator 40 interface and configuration status necessary for reconfiguration of the demodulator to support multiple waveform processing described in the following paragraphs.

Referring also to FIG. 4, digital demodulator 40 (see FIG. 2) is illustrated within broken lines. The demodulator circuit 40 is illustrative of a typical demodulator used in the art, however, subject invention may utilize various demodulator circuits containing various functional blocks and loops. A typical demodulator circuit 40 includes various functionality such as digital down conversion 70, filter/decimation 75, timing recovery 80, matched filtering 80A, timing error detecting 85, loop filtering 90, 105, numerically controlled oscillating 95,110 and phase error detecting 100. Referring to FIG. 4, demodulator 40 is illustrated within broken lines and includes phase and frequency recovery loop 41 and symbol timing recovery loop 42.

As multiple waveforms pass through the demodulator 40, functional blocks 70 through 110 shown in demodulator 40 are reconfigured or switched to demodulate multiple waveforms. Functional blocks 70 through 110 are individually reconfigured via waveform configuration controller 40z to utilize suitable demodulation parameters when the last sample from the current waveform exits each functional block 70 through 110 and the first sample from the next waveform enters each functional block, 70 through 110. Blocks 70 through 110 process and delay waveform control signals as multiple waveforms pass through demodulator 40.

Feedback loops are also reconfigured (opened and closed) to support the processing of the current and next waveforms throughout the demodulation. In one embodiment, demodulator 40 is provided with an array of gates, arithmetic logic units or ALUs, registers and other circuit blocks, elements or modules to provide a circuit to recover the associated carrier.

In alternate embodiments, at a higher level, the demodulator may be configured in layers, with each layer containing gates and logic as well as filtering to provide a circuit specially tailored for carrier recovery of a different modulation format type. The configuration RAM 40E shown in FIG. 3 selects which of the layers is to be activated, thereby taking advantage of embedded demodulation logic in each of the layers.

Figure 5:
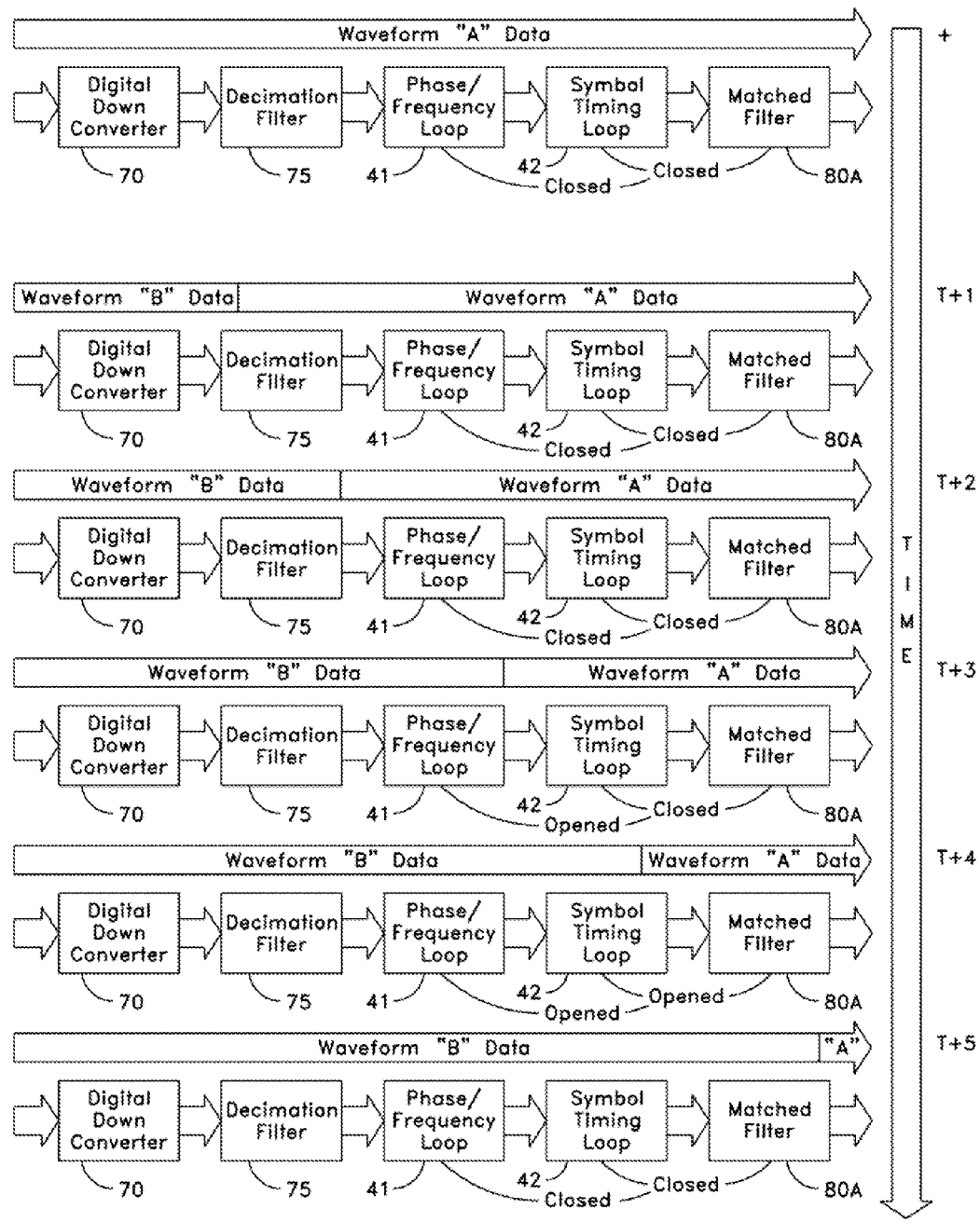
FIG. 5 is a hardware configuration timeline illustrating the method of waveform switching of subject invention.

Referring also to FIG. 5 there is shown a waveform-timing diagram illustrating features of the present invention. At time T, waveform "A" is illustrated as passing through Demodulator 40. Configuration RAM 40E has downloaded the appropriate Demodulation mode parameters to all Demodulator 40 functional blocks through Configuration RAM 40E. At time T+1 waveform "B" enters Digital Down Converter 70 with Configuration RAM 40E loading waveform "B" demodulation parameters for Digital Down Converter 70 only. At this point, two waveforms are being demodulated concurrently in Demodulator 40 and previous demodulator functional block settings for waveform "A" remain unchanged. Demodulator 40 feeds back demodulator configuration settings from Demodulator Functional Blocks 70,75, 41, 42, and 80A into host processor 40D at each time period T+N (where N=0, 1, 2, 3 . . . ).

Host processor 40D then processes the current and next demodulator settings information and determines demodulation format settings for output to configuration controller 40F. Furthermore, host processor 40D utilizes the current and next demodulator program settings to control the opening and closing of loops in the system, thereby allowing concurrent processing of multiple waveforms. At time T+2, waveform "B" enters Decimation Filter 75 and Configuration RAM 40E, via command from host processor 40D, loads waveform "B" parameters into decimation filter 75 only. At time T+3, waveform "B" enters phase/frequency loop 41 and configuration RAM 40E, via command from host processor 40D, loads waveform "B" parameters into the functional blocks contained within loop 41, then opens loop 41. Loop 41 is opened to prevent waveform "A" and "B" data from processing in the same loop. Blocks 70 through 110 process and delay waveform control signals as multiple waveforms pass through demodulator 40.

The feedback information from demodulator 40 includes the current waveform parameter settings and allows host processor to compare current and next waveform parameters. If host processor detects different waveforms in the same loop it will open the loops for a time period sufficient enough to allow the current waveform to pass through, then close the loop for the next waveform processing. At Time T+4, waveform "B" data enters symbol timing loop 42 and configuration RAM 40E, via command from host processor 40D, loads waveform "B" parameters into loop 42 functional blocks then opens loop 42 to prevent waveform "A" and "B" data from processing in the same loop. At time T+5, host processor detects that waveform "A" has exited both loops 41 and 42, and commands configuration RAM 40E to close loops 41 and 42.

At time t+5 waveform "A" has been demodulated with only waveform "B" currently being processed in demodulator 40. The method of reconfiguring the demodulator would continue for subsequent waveform "C", "D", etc., inputs into receiver 40A.

It is understood that the present invention might be embodied in many alternate forms of embodiments, e.g., MODEMS, receiver's etc. In addition, it should be understood that the teachings herein may apply to any group or assembly of receivers, including those that are fixed in place; vehicle mounted; and/or hand carried.

In addition, in alternate embodiments features of the present invention may be implemented in a programmable device such as an integrated circuit (IC). It will be further appreciated that the IC may be a field programmable gate array (FPGA), an application specific IC (ASIC), or a function of firmware. The operation of the ICs or firmware may be defined by a suitable programming language such as a Very High Speed Integrated Circuit (VHSIC) Hardware Description (VHDL) Language file. Accordingly, the present invention is intended to embrace all such alternatives, modifications, and variances that fall within the scope of the appended claims.

What is claimed is:

1. A method for demodulating a plurality of input waveforms within a first and second demodulator time frame, respectively, within software configurable hardware, the software configurable hardware defined by a plurality of functional blocks, the functional blocks having input nodes, output nodes, and a plurality of feedback nodes, the plurality of feedback nodes defining feedback loops within the hardware, the method comprising:

receiving a first input waveform;

determining a first modulation format type of the first input waveform;

generating a first configuration instruction based on said first modulation format type to the software configurable hardware;

configuring the software configurable hardware in accordance with said first modulation format type specified by said first configuration instruction;

receiving a second input waveform;

determining a second modulation format type of the second input waveform;

generating a second configuration instruction based on said second modulation format type to the software configurable hardware;

configuring the software configurable hardware in accordance with said second modulation format type specified by said second configuration instruction;

determining if said software configurable hardware contains at least one feedback node of said plurality of feedback nodes; and opening said at least one feedback node during said second demodulator time frame if said first configuration instruction is different from said second configuration instruction thereby allowing concurrent demodulation of multiple waveforms.

2. A method as in claim 1, wherein opening said at least one feedback node further includes:

closing said at least one feedback node during a successive demodulator time frame when said first input waveform exits a feedback loop associated with said feedback node.

3. A method as in claim 1, wherein determining the first and second modulation format type of said first and said second input waveforms, respectively, further includes processing header information of said first and said second input signals.

4. A method as in claim 1, wherein generating said first and said second configuration instructions further includes concurrently storing said first and said second configuration instructions.

5. A method as in claim 4, wherein the steps of configuring said software configurable hardware during said first and said second demodulation time frames further includes the steps of downloading said stored modulation format configuration data to said software configurable hardware, said modulation configuration data reconfiguring the plurality of functional blocks to demodulate said first and said second input signals.

6. A method as in claim 1, wherein determining if said software configurable hardware contains said at least one feedback node further comprises:

searching the plurality of functional blocks for said at least one feedback node.

7. A system in which information is transmitted from a send side to a receive side over a communications channel, the receive side including software configurable logic, the system comprising:

means for determining a plurality of modulation format types; and means for demodulating the transmitted information, said means for demodulating further comprising means for generating instructions for performing said demodulating based on modulation format configuration data, said means for generating instructions responsive to said means for determining said plurality of modulation format types, said means for determining demodulating further including means for determining feedback loops contained within said software configurable logic, said software configurable logic capable of a plurality of concurrent demodulation configurations corresponding to said modulation format configuration data and said feedback loops.

8. A system as in claim 7, wherein said means for determining said plurality of modulation format types is a host processor, said host processor extracting header information from said transmitted information, said host processor determining said modulation format from said header information.

9. A system as in claim 8, wherein said means for demodulating said transmitted information further includes:
- a configuration controller; and
- a configuration RAM responsive to said configuration controller, wherein said host processor outputs said plurality of modulation format types to said configuration controller, said configuration controller selects from said configuration RAM at least one demodulation mode, the at least one demodulation mode reconfiguring said software configurable logic.

10. A program storage device tangibly embodying a program of instructions executable by a machine for demodulating multiple waveforms within software configurable hardware, the software configurable hardware defined by a plurality of functional blocks, the functional blocks having input nodes, output nodes, and a plurality of feedback nodes, the plurality of feedback nodes defining plurality of feedback loops within the hardware, the instructions comprising:
- determining a modulation format type of a first input signal during a first demodulation time frame;
- generating a first configuration instruction to the software configurable hardware during said first demodulation time frame, based on said modulation format type;
- configuring the software configurable hardware during said first demodulation time frame to the modulation format type specified by said first configuration instruction, wherein the software configurable hardware includes logic elements whose functionality is capable of being changed in software;
- determining a modulation format type of a second input signal during a second demodulation time frame;
- generating a second configuration instruction to the software configurable hardware during said second demodulation time frame, based on said second modulation format type;
- configuring the software configurable hardware during said second demodulation time frame to the modulation format type specified by said second configuration instruction, wherein the software configurable hardware includes logic elements whose functionality is capable of being changed in software;
- determining if said software configurable hardware at said second demodulator time frame contains at least one feedback node of said plurality of feedback nodes; and
- opening said at least one feedback node during said second demodulator time frame if said first configuration instruction is different from said second configuration instruction, thereby allowing concurrent demodulation of multiple waveforms.

* * * * *

UNITED STATES PATENT AND TRADEMARK OFFICE
CERTIFICATE OF CORRECTION

PATENT NO. : 7,440,517 B1 Page 1 of 1
APPLICATION NO. : 10/944685
DATED : October 1, 2008
INVENTOR(S) : Roland R. Henrie, Brad T. Hansen and Osama Haddadin It is certified that error appears in the above-identified patent and that said Letters Patent is hereby corrected as shown below:

On the Title Page, Item (76) the spelling of inventor "Roland R. Henne" should read:
-- Roland R. Henrie --.

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,440,517 B1 |
| APPLICATION NO. | : 10/944685 |
| DATED | : October 21, 2008 |
| INVENTOR(S) | : Roland R. Henrie, Brad T. Hansen and Osama Haddadin |

It is certified that error appears in the above-identified patent and that said Letters Patent is hereby corrected as shown below:

On the Title Page, Item (76) the spelling of inventor "Roland R. Henne" should read:
-- Roland R. Henrie --.

This certificate supersedes the Certificate of Correction issued April 21, 2009.

Signed and Sealed this

Twelfth Day of May, 2009

JOHN DOLL
*Acting Director of the United States Patent and Trademark Office*